Dec. 21, 1943.   R. J. LIMBERT ET AL   2,337,116
METHOD OF FORMING RUBBER ARTICLES
Filed Dec. 31, 1940
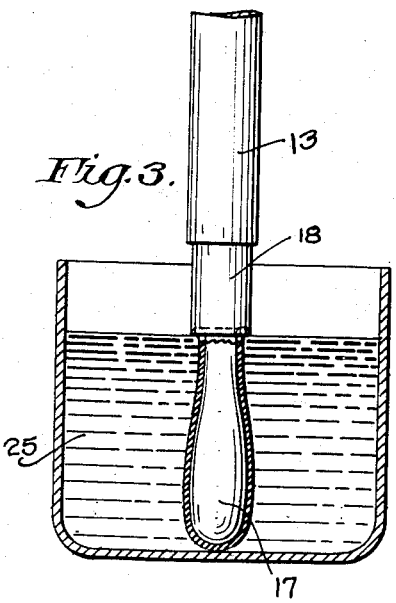
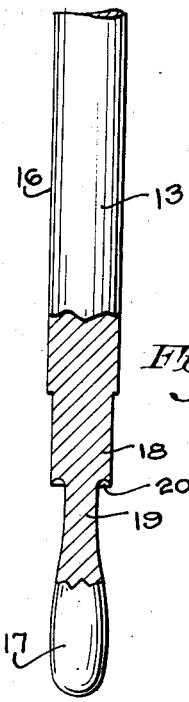
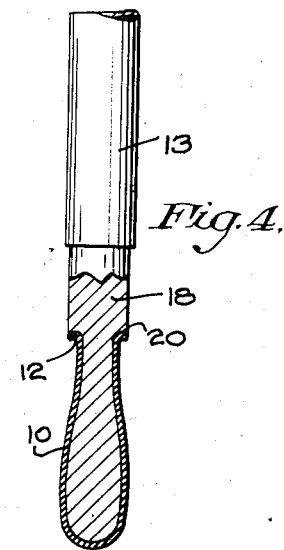
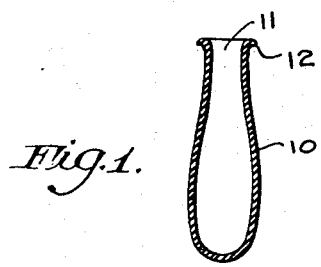
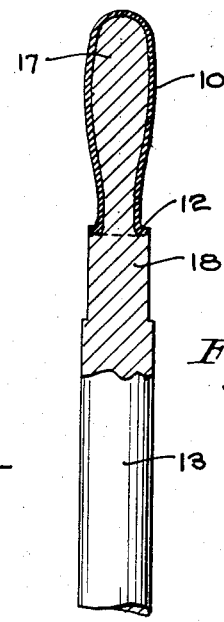
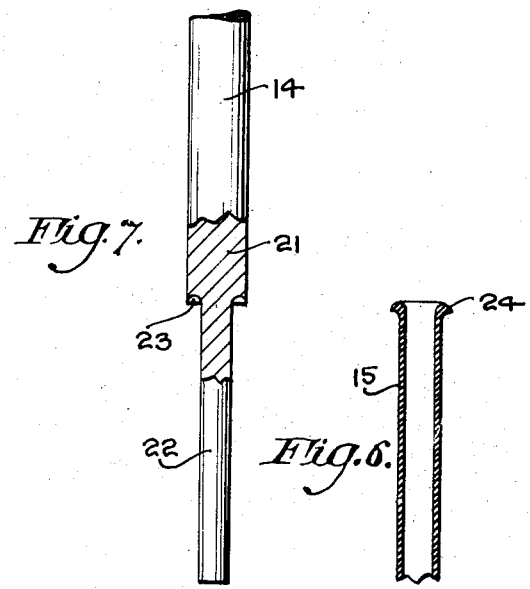
Inventor
ROLLIN J. LIMBERT
ELDEN E. LEACH
By Leon Edelson
Attorney.

Patented Dec. 21, 1943

2,337,116

UNITED STATES PATENT OFFICE 2,337,116

METHOD OF FORMING RUBBER ARTICLES

Rollin J. Limbert, Conshohocken, and Elden E. Leach, Norristown, Pa., assignors to Lee Rubber & Tire Corporation, Conshohocken, Pa., a corporation of New York Application December 31, 1940, Serial No. 372,559

2 Claims. (Cl. 18—58)

This invention relates generally to the art of forming rubber articles and more particularly to a method of producing articles of rubber or rubber-like material which are of hollow form and having an open end and which are characterized by the provision of a marginal bead surrounding and defining said open end, examples of such articles being medicine dropper bulbs, gloves, prophylactics, tubes and the like.

Heretofore and prior to this invention it has been the general practice to produce such articles by coating a suitably designed form with the material of which the article is formed, the usual procedure being to dip or otherwise submerge the article in a liquefied bath of the said material. This material, which may be of any suitable compounded or uncompounded natural or synthetic latex becomes set upon the form when the latter is removed from the bath and is then subsequently cured upon the form in accordance with conventional practice, following which it is stripped from its supporting form as the finished article. The thickness of the material of which the article is formed is governed generally by the number of coatings of material applied to the article-forming body and, of course, the viscosity of the liquid bath, it being understood that, in accordance with generally accepted and well-known practice in the art, each separate coating step is followed by a drying step so as to set the material prior to again dipping or emersing it in the liquid bath.

In order to form the requisite marginal bead about the open end of the article formed as above described, the common practice has been to provide such article with an elongated neck surrounding said open end, the material of which this neck is formed being then manually rolled down upon itself to form the said marginal bead. This method of forming the marginal bead provides no accurate control for the thickness of the bead and generally results in the formation of a bead which is of non-uniform thickness throughout its circumferential extent and the axis of which lacks coincidence with the principal axis of the formed article.

Among the principal objects of the present invention is to provide a method of forming the marginal bead integrally with the article of which it is an element, the bead being formed during the operation of forming the article itself, thereby eliminating any necessity for manual manipulation of the formed and set article either prior to or after the final curing operation.

A further object is to provide a method of producing a marginal bead which is not only of uniform thickness throughout its circumferential extent but of a thickness which is not dependent upon the wall thickness of the hollow main body of the formed article.

Still other objects and advantages of the present invention will appear more fully hereinafter, it being understood that the invention consists substantially in the combination, construction and relative arrangement of parts and in the method of employing the same, all as is described more fully hereinafter, as shown in the accompanying drawing and as finally pointed out in the appended claims.

In the said accompanying drawing:

Figure 1 is a vertical sectional view of an article formed in accordance with and embodying the principles of the present invention;

Figure 2 is a view, partially in vertical section, of a forming tool for producing the article of Figure 1;

Figure 3 is a view showing the forming tool in position in the liquid bath of article-forming material;

Figure 4 is a view showing the forming tool removed from the bath and coated with the article-forming material;

Figure 5 is a view showing the forming tool inverted after removal from the liquid bath;

Figure 6 is a vertical sectional view of another form of article produced in accordance with the present invention; and Figure 7 is a view, partially in vertical section, of the forming tool for producing the article of Figure 6.

Referring now to the drawing and more particularly to Figure 1 thereof, it will be observed that the present invention relates generally to the production of articles formed of rubber or rubber-like material such as the medicine dropper bulb 10, such articles being characterized in that they are provided with an open end 11 the marginal edge of which is formed with an annular reinforcing and finishing bead 12. The present invention is directed more particularly to the method of and means for producing this marginal bead 12, the production of such beads being accomplished in such manner as to rigidly control and render uniform the size and shape of the marginal bead throughout its circumferential extent and at the same time insure that all of the articles produced on a given form are provided with marginal beads 12 of uniform shape, size and appearance.

In the production of the articles of the character herein contemplated, a forming tool is first made, this forming tool being provided with a formed section having an external shape corresponding to that of the article to be formed. Figure 2 shows a forming tool, designated generally by the reference numeral 13, which is adapted for use in the production of medicine dropper bulbs, such as are shown in Figure 1, while Figure 7 shows a forming tool designated generally by the reference numeral 14, for use in the production of tubular bodies 15, as illustrated in Figure 6. Referring now more particularly to Figure 2, it will be noted that the forming tool 13 thereof is provided with a main body portion 16 which is preferably in the form of an elongated rod or bar, one end of this body 16 terminating in a bulbous shaped element 17. Inasmuch as this bulbous-shaped element 17 of the forming tool 13 constitutes the form upon which the bulb 10 is produced, it is of an external shape and size which corresponds to the internal shape and size of the said bulb 10.

It will be noted that the forming tool 13 is provided with a cylindrically shaped section 18 located between the bulbous shaped portion 17 and the elongated body portion 16, this cylindrical portion 18 being of a diameter greater than that of the immediately adjoining reduced portion 19 of the bulbous shaped element 17. There is thus provided in the immediate vicinity of the inner reduced end of the bulbous shaped element 17 an annular shoulder which is under cut, as at 20, to provide an annular groove surrounding the base or inner extremity of the reduced portion 19 of the bulb-forming element 17.

In the case of the tube forming tool 14, such as is shown in Figure 7, the elongated body portion 21 thereof is provided at one end thereof with an axially projecting element 22 of reduced diameter, this latter element being of a diameter equal to the internal diameter of the tube to be formed thereon. As in the case of the bulb-forming tool 13 of Figure 2, the tube forming tool 14 is also provided with an annular groove 23 marginally surrounding the inner extremity of the tube-forming element 22, this annular element 23 being provided for the purposes of forming the annular bead 24 at one extremity of the tube 15 of Figure 6.

In the use of the forming tools constructed in accordance with and embodying the principles of the present invention, the liquefied material of which the article to be produced is formed is caused to flow into the annular groove 20 of Figure 2 or 23 of Figure 7 either by capillary action of the material on the forming tool when the latter is dipped into a bath of the material as shown in Figure 3 or by gravity flow when the forming tool is inverted into the position shown in Figure 5 after having been initially dipped into a bath such as that shown in Figure 3. Preferably, reliance is had on the capillary phenomenon in producing the desired marginal bead because of the better control which it affords in the formation of marginal beads of uniform size, shape and appearance.

As is illustrated in Figure 3, a liquefied bath 25 of any suitable material is initially prepared, which material may be of any suitable compounded or uncompounded natural or synthetic latex such as may be employed in the production of rubber or rubber-like materials.

Having prepared such a bath 25, the forming tool requisite for the production of a particular article, such as the forming tool 13 for producing medicine dropper bulb 10 or the forming tool 14 for the production of the tube 15, is dipped into the bath 25 so as to submerge in the bath the article forming part of the tool to a point where the annular groove surrounding the inner extremity of said part is disposed in slightly spaced relation to the surface level of the bath 25. Any suitable means (not shown herein) may be employed for controlling the extent to which the forming tool is dipped into the bath 25 as well as for insuring a constant surface level for said bath, it being preferred in actual practice of the present invention to provide a bath 25 of sufficient volume and exposed surface area to accommodate a relatively large number of forming tools at one time.

It will be apparent that due to the capillary phenomenon resulting when a solid is placed in contact with the free surface of a liquid, upon immersing the forming tool 13 into the bath of liquefied latex or the like to the extent above described, the liquid in contact with the tool at the liquid surface level curves upwardly about the surface of the tool and fills completely the annular groove 20 thereof. The filling of this curve 20 is effected immediately upon the initial dipping of the tool into the bath. The tool is thereupon removed from the bath so as to permit the film of material adhering thereto to be set in accordance with conventional and well-known practices, following which the tool may again be dipped into the bath as many times as may be desired to produce the requisite thickness in the wall of the article being formed. As has been pointed out hereinbefore, in accordance with generally accepted and well-known practice in the art, each separate dipping is followed by a drying step so as to set the material prior to again dipping or immersing it in the liquid bath, it being further understood that the thickness of the material of which the article is formed is governed generally not only by the number of dippings to which the forming body is subjected, but also by the viscosity of the liquid.

Inasmuch as the bead forming groove is of fixed shape and size for a given article, it will be apparent that all of the articles formed in accordance with the present invention will be provided with marginal beads consistently uniform in shape, size and appearance. Furthermore, it will be apparent that the shape and size of the bead is in no sense dependent upon the thickness of the material forming the wall or main body of the article due to the fact that while a single dipping of the tool in the bath may result in a relatively thin wall as compared with that obtained as the result of several dippings of the tool in the bath, the bead per se remains uniformly the same in size and shape.

Substantially the same results may be obtained by dipping the forming body partially into the liquefied bath 25 and then inverting it into the position shown in Figure 5 to permit the liquefied material adhering thereto to flow by gravity into the bead-forming groove or channel. In such case, the operator, however, must be careful to see that the gravity flow of material is not so great as to over-run the outer marginal edges of the annular bead forming groove. However, an experienced operator may readily prevent such overflow by the simple expedient of reversing the form the instant that the liquefied material has completely filled the groove so as to interrupt further flow of the material downwardly into said groove.

It will be understood, of course, that after the forming tool has been dipped the requisite number of times into the bath 25 to produce a body thickness such as may be desired, the tool with the latex adhering thereto in the form of a set film is placed in any suitable curing apparatus in order to cure the material enveloping the article forming part thereof. Following this curing operation, the cured body may be readily stripped from its supporting form as the finished article.

It will be apparent, of course, that the present invention is applicable for the production of all articles of rubber or rubber-like material which are of hollow form and have an open end and which are characterized by the provision of a marginal bead surrounding and defining said open end. Also, it will be apparent that the dipping forms may be of any desired shape other than the two specific forms respectively illustrated in Figures 2 and 7 of the drawing herein. While we have shown and described the bead forming grooves 20 of Figure 2 and 23 of Figure 7 as being of circular form, it will be understood that the bead-forming groove or channel may be of any desired non-circular perimetral shape. In addition, such marginal bead is not necessarily limited to a cross-section of the semi-circular form such as is shown in the drawing but instead may be of any cross-section such as may be obtained by correspondingly changing the cross-sectional shape of the groove in the forming tool.

Still other changes and modifications may be made from time to time without departing from the general principles of the present invention and, accordingly, the same is intended to be claimed broadly, as well as specifically, as indicated in the appended claims.

What is claimed as new and useful is:

1. A method of forming a hollow body of rubber or like material having a beaded open end which consists in dipping in a bath of liquid rubber or the like a forming body corresponding in external shape to the shape of the hollow body, said forming body having a groove corresponding in shape and outline to that of the bead to be formed on said hollow body, the forming body being submerged in the bath with the groove so spaced above the surface of the bath as to cause said groove to be filled with the bath material by capillary action at the same time that the surface of said forming body is coated with said material.

2. A method of forming a bulb of rubber or like material having a marginal bead surrounding the open end thereof which consists in producing a dripping form for said bulb having a bulbous shaped body extending axially of a supporting body, said form being provided with an annular groove at the juncture of said bulbous shaped body and its supporting body, in dipping said form into a bath of liquid rubber or the like to a depth just sufficient to position said groove in spaced relation above the surface level of the bath to enable said bath material to flow by capillary action into said groove simultaneous with the coating of the entire surface of the bulbous shaped body and in subsequently drying and curing said coating upon said dipping form.

ROLLIN J. LIMBERT.
ELDEN E. LEACH.